US008245148B2

(12) United States Patent
Hiraiwa

(10) Patent No.: US 8,245,148 B2
(45) Date of Patent: Aug. 14, 2012

(54) HISTORY DISPLAY APPARATUS, HISTORY DISPLAY SYSTEM, HISTORY DISPLAY METHOD, AND PROGRAM

(75) Inventor: Kenichiro Hiraiwa, Tokyo (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 12/620,456

(22) Filed: Nov. 17, 2009

(65) Prior Publication Data

US 2010/0131898 A1 May 27, 2010

(30) Foreign Application Priority Data

Nov. 25, 2008 (JP) ................ P2008-299923

(51) Int. Cl.
*G06F 13/00* (2006.01)
*G06F 15/00* (2006.01)
(52) U.S. Cl. ....................... 715/765; 715/851
(58) Field of Classification Search .......... 715/761–765, 715/838–841, 851–854, 738–741
See application file for complete search history.

(56) References Cited

U.S. PATENT DOCUMENTS 5,831,617 A * 11/1998 Bhukhanwala ............... 715/839
2005/0132018 A1* 6/2005 Milic-Frayling et al. ..... 709/213

FOREIGN PATENT DOCUMENTS

JP 2007-179282 7/2007

* cited by examiner

*Primary Examiner* — Cao "Kevin" Nguyen
(74) *Attorney, Agent, or Firm* — Finnegan, Henderson, Farabow, Garrett & Dunner, L.L.P.

(57) ABSTRACT

According to an operation of a frame on an arrangement of history information displayed in a sequence, shared history information including action information which relates to action information having a first identifier selected by the frame and has a second identifier is obtained from a server. Identifiers included in action information items included in the shared history information are displayed in the sequence, in parallel with the arrangement of the history information so that the second identifier is displayed adjacent to the first identifier. Via the first and the second identifiers, the frame is moved between the arrangements of the history information and the shared history information, and according to an operation of the frame in the before-after direction of the sequence on the arrangement to which the frame is moved, an identifier included in an action information item in the before-after direction of the sequence is displayed.

20 Claims, 15 Drawing Sheets

FIG. 14
HISTORY INFORMATION OF USER F
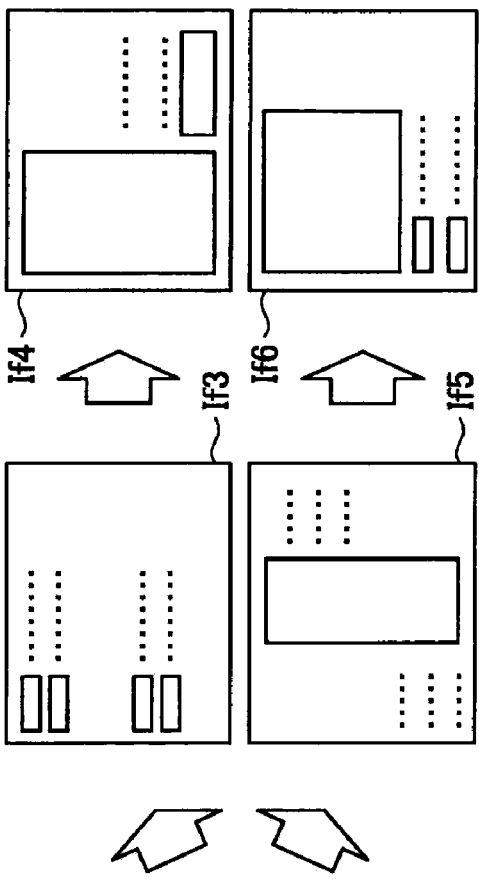
HISTORY INFORMATION OF USER G
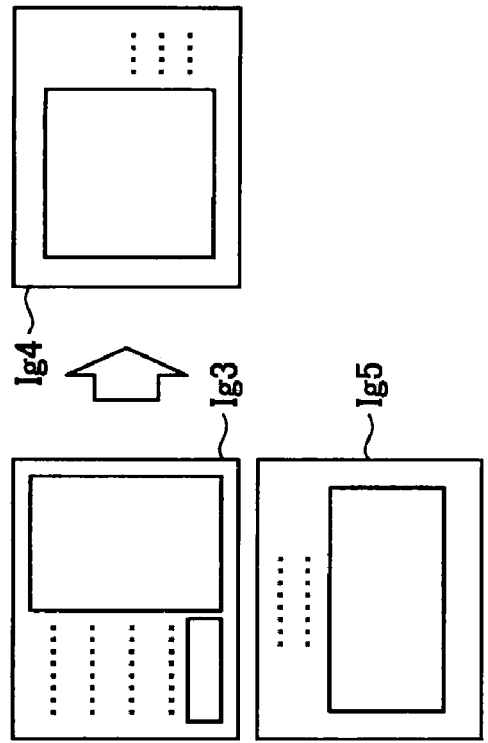

HISTORY DISPLAY APPARATUS, HISTORY DISPLAY SYSTEM, HISTORY DISPLAY METHOD, AND PROGRAM

BACKGROUND OF THE INVENTION

1. Field of the Invention

The present invention relates to a history display apparatus, a history display system, a history display method, and a program.

2. Description of the Related Art

In the related art, a system for managing a user's Web page browsing history, a contents use history, and a user's action history is known. For example, in a system which manages Web page browsing history, user's browsing operations are accumulated as history information, so that the user can refer to his or her own browsing history from page browsing records displayed based on the history information.

In Japanese Patent Application Laid-Open No. 2007-179282, a user interface which uses Web page icons (reduced images of screen shots) to display Web page browsing history in a time-series tree structure is disclosed. A user can easily refer to his or her browsing history from page browsing records displayed by using icons.

SUMMARY OF THE INVENTION

In recent years, a system for collectively managing multiple users' action histories is used. For example, in a system which collectively manages Web page browsing histories, users' page browsing operations are accumulated as users' shared history information, and page browsing records of each user are displayed. In this way, a user can refer to his or her own browsing history and other users' browsing histories, so that the user can obtain useful information by referring to other users' browsing histories. However, when referring to multiple users' action histories, to efficiently refer to multiple action histories, it may be desired that the action histories are separately displayed or the action histories are correlated with each other to be displayed.

The present invention has been made in view of the above issues, and it is desirable to provide a novel and improved history display apparatus, history display system, history display method, and program which are able to efficiently refer to multiple action histories.

According to a first embodiment of the present invention, a history display apparatus including a first obtaining unit which obtains history information representing one or more action histories of a user by action information items having identification information items representing action objects of the user, a second obtaining unit which obtains from an external apparatus shared history information representing one or more action histories of other user by action information items having identification information items representing the other user's action objects, a display unit which arranges and displays the identification information items held by the one or more action information items included in the history information in a predetermined history sequence, and arranges and displays the identification information items held by the one or more action information items included in the shared history information in the predetermined history sequence, and an operation unit which causes the user to move a selection frame on an arrangement of the history information and an arrangement of the shared history information is provided.

In the history display apparatus, the second obtaining unit obtains from the external apparatus the shared history information including an action information item which relates to the action information item having the first identification information item selected by the selection frame and has a second identification information item according to a move operation of the selection frame on the arrangement of the history information. The display unit displays the second identification information item next to the first identification information item in a different direction from the arrangement direction of the history information, and arranges and displays two or more identification information items included in the shared history information in parallel with the arrangement of the history information in the predetermined history sequence. The operation unit moves the selection frame between the arrangement of the history information and the arrangement of the shared history information via the first and the second identification information items. The display unit displays an identification information item held by an action information item which is included in the history information and is arranged in a before-after direction of the history sequence, according to a move operation of the selection frame in the before-after direction of the history sequence on the arrangement of the history information, and displays an identification information item held by an action information item which is included in the shared history information and is arranged in the before-after direction of the history sequence, according to a move operation of the selection frame in the before-after direction of the history sequence on the arrangement of the shared history information.

According to such a configuration, first, according to a move operation of a selection frame on the arrangement of the history information arranged and displayed in a predetermined history sequence, the shared history information including an action information item which relates to an action information item having a first identification information item selected by the selection frame and has a second identification information item is obtained from an external apparatus. Next, identification information items included in two or more action information items included in the shared history information are arranged and displayed in parallel with the arrangement of the history information in a predetermined history sequence so that the second identification information item is displayed adjacent to the first identification information item. Thereafter, via the first and second identification information items, the selection frame is moved between the arrangement of the history information and the arrangement of the shared history information, and according to the move operation of the selection frame in the before-after direction of the history sequence on the arrangement to which the selection frame is moved, an identification information item included in an action information item in the before-after direction of the history sequence is displayed.

In this way, by moving the selection frame between the arrangement of the history information and the arrangement of the shared history information which are connected via the first and the second identification information items, and referring to the action information items included in the history information and the shared history information, the user can efficiently refer to his or her own action history and other users' action histories.

According to a second embodiment of the present invention, a history display system including the above-mentioned history display apparatus and an external apparatus which can be connected to the history display apparatus via a communication line and stores at least the shared history information of the other user is provided. According to a third embodiment of the present invention, a history display method applicable to the history display apparatus of the first embodiment of the present invention is provided. According to a fourth embodiment of the present invention, a program for causing a computer to execute the history display method of the third embodiment of the present invention is provided.

According to the present invention, it is possible to provide a history display apparatus, a history display system, a history display method, and a program which are able to efficiently refer to multiple action histories.

BRIEF DESCRIPTION OF THE DRAWINGS

FIG. 14 is an illustration showing an example of a display screen when displaying the browsing information items by using a tree structure.

DETAILED DESCRIPTION OF EMBODIMENT

Figure 1:
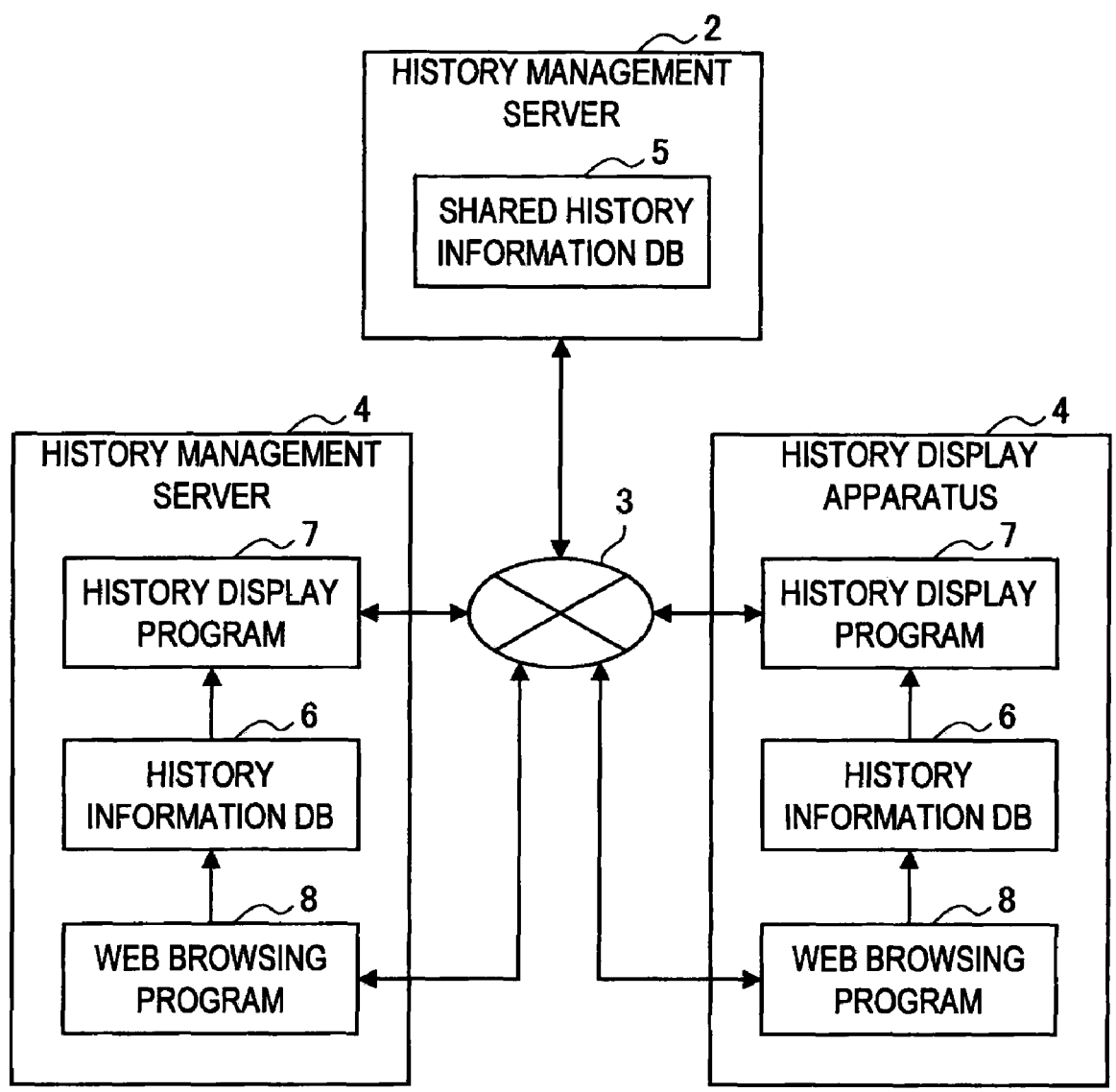
FIG. 1 is a diagram showing a configuration of a history management system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Configuration of a History Management System]

First, a history display system 1 according to an embodiment of the present invention will be described with reference to FIGS. 1 and 2. Hereinafter, as an example of a system for displaying multiple users' action histories, the history display system 1 which displays a browsing history of Web pages will be described. In FIG. 1, a configuration of the history display system 1 is illustrated, and in FIG. 2, an example of a history display by the history display system 1 is illustrated.

As shown in FIG. 1, the history display system 1 is configured to include a history management server 2 (hereinafter also called "server 2") and one or more history display apparatuses 4 connectable to the server 2 via a network 3. Although, hereinafter, a case in which the history display system 1 is configured by a client-server type network will be described, the history display system 1 may be configured by a peer-to-peer type network.

The server 2 has a shared history information data base (DB) 5 for storing users' history information as shared history information in order to share history information of one or more users between users. Each history display apparatus 4 has a history information data base (DB) 6 for storing history information of a user who uses the history display apparatus 4. Each history display apparatus 4 also has a history display unit constituted by a history display program 7 or the like, and a Web browsing unit constituted by a Web browsing program 8 or the like.

When a user performs a Web browsing operation by using the Web browsing program 8, the history display apparatus 4 creates a browsing information item as an action information item indicating the browsing action of the user. For example, the browsing information includes an icon (identification information) representing the browsed Web page, the address of the Web page, and information (date and time of the browsing, or the like) for identifying the history sequence. Each history display apparatus 4 updates the user's history information stored in the history information DB 6 by using the browsing information, and transmits the browsing information to the server 2. The server 2 updates the users' shared history information stored in the shared history information DB 5 by using the users' browsing information.

When a user performs a display operation of the browsing history by using the history display program 7, the history display apparatus 4 retrieves (reads) the user's history information from the history information DB 6, and arranges and displays icons in two or more browsing information items included in the history information in a predetermined history sequence. The history display apparatus 4 displays a cursor C on the arrangement of the history information to cause a user to select an icon in the browsing information included in the history information.

In accordance with a move operation of the cursor C on the arrangement of the history information, the history display apparatus 4 obtains other user's shared history information including browsing information which relates to the browsing information having a first icon selected by the cursor C and has a second icon. Thereafter, the history display apparatus 4 displays the second icon next to the first icon in a direction different from the arrangement direction of the history information, and arranges and displays icons of one or more browsing information items included in the shared history information in the same direction as the arrangement of the history information.

When the second icon is displayed, the user can move the cursor C between the arrangement of the history information and the arrangement of the shared history information via the first and the second icons. When the user moves the cursor C on the arrangement of the history information, the history display apparatus 4 displays an icon included in the browsing information item arranged in the before-after direction of the history sequence in the history information, according to the move operation of the cursor C in the before-after direction of the history sequence. When the user moves the cursor C on the arrangement of the shared history information, the history display apparatus 4 displays an icon included in the browsing information in the before-after direction of the history sequence included in the shared history information according to the move operation of the cursor C in the before-after direction of the history sequence.

In this way, by moving the cursor C between the arrangement of the history information and the arrangement of the shared history information which are connected via the first and the second icons, and referring to the browsing information items included in the history information and the shared history information, the user can efficiently refer to his or her own browsing history and other users' browsing histories.

Figure 2:
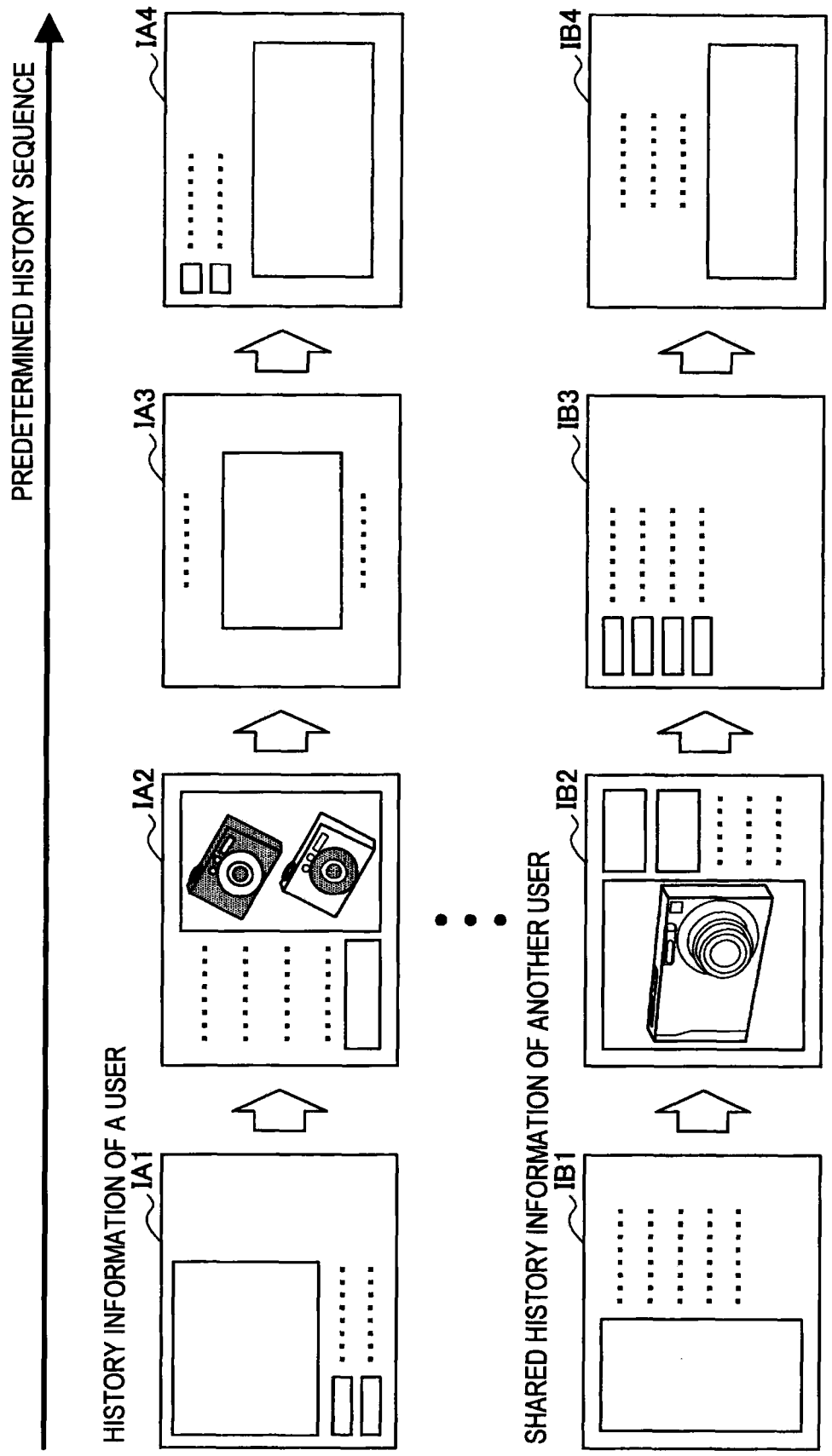
FIG. 2 is an illustration showing an example of a history display by the history management system.

In FIG. 2, icons IA1 to IA4 in the browsing information items included in the history information of a user are arranged in a horizontal row, and in parallel with the arrangement of the history information of the user, icons IB1 to IB4 in the browsing information items included in the shared history information of other users are arranged in a horizontal row. Here, the browsing information items are arranged and displayed according to a predetermined history sequence. The user's history information and other users' shared history information are connected to each other via the icons IA2 and IB2 of the browsing information items related to each other and displayed (for example, connected by a dotted line and displayed in FIG. 2). Here, for example, the history information and the shared history information are connected and displayed based on the relationship between the browsing information item of the history information and the browsing information item of the shared history information, the relationship between attribute information of the browsing information item of the history information and attribute information of the browsing information item of the shared history information, and the like.

[2. Configuration of a History Display Apparatus 10]

First, the history display apparatus 10 (corresponding to the history display apparatus 4 shown in FIG. 1) according to this embodiment will be described with reference to FIG. 3. For example, the history display apparatus 10 is configured as an information processing apparatus such as a personal computer, a Personal Digital Assistance (PDA), and a mobile phone.

Figure 3:
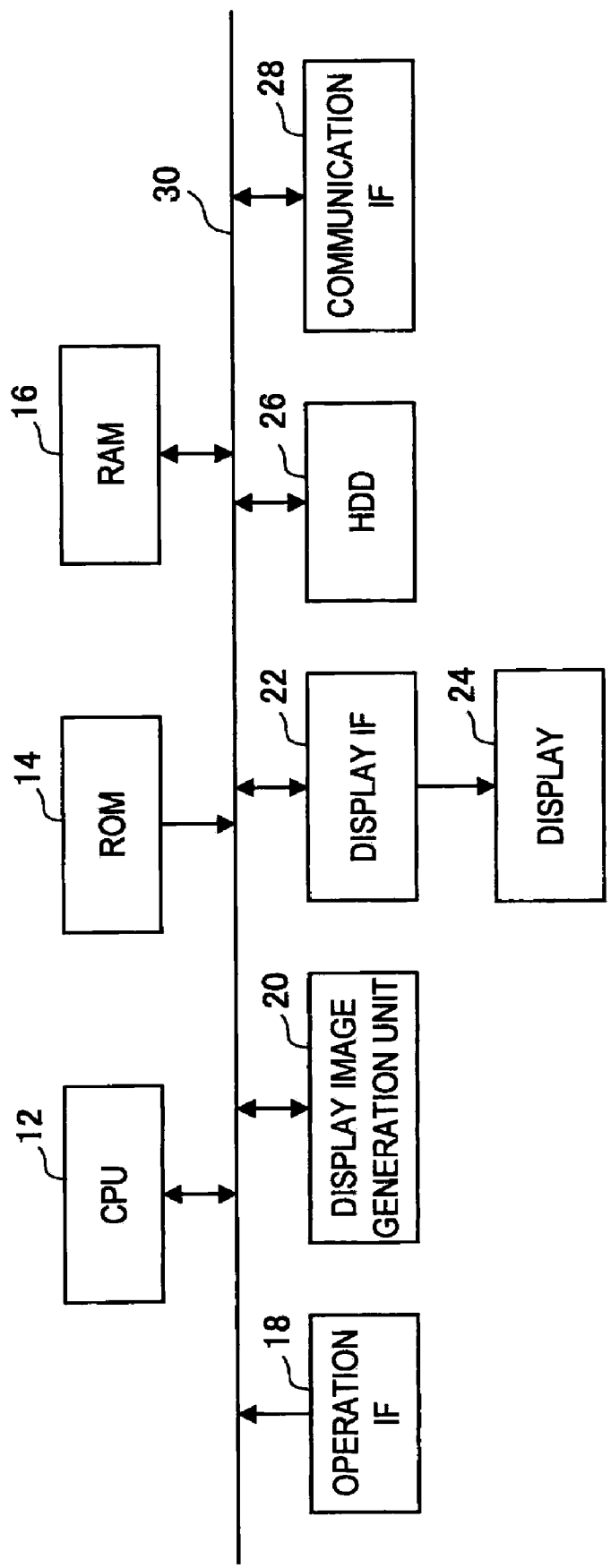
FIG. 3 is a block diagram showing a configuration of a history display apparatus according to the embodiment.

As shown in FIG. 3, the history display apparatus 10 is configured to include a CPU 12, a ROM 14, a RAM 16, an operation interface (IF) 18, a display image generation unit 20, a display interface (IF) 22, a display 24, a hard disk drive (HDD) 26, and a communication IF 28 which are connected via a bus 30.

When the history display apparatus 10 is started, the CPU 12 reads a system program from the ROM 14, develops the system program on the RAM 16, and executes the system program, so that the CPU 12 performs processing necessary for a basic operation of an information processing apparatus, and controls for each unit. Also, the CPU 12 reads application programs such as a history display program 7, a Web browsing program 8 through the HDD 26 or the like, develops the application programs on the RAM 16, and executes the application programs. The CPU 12 performs processing necessary for an operation of the history display apparatus 10, and controls for each unit, as described below, according to the history display program 7. The CPU 12 functions as a first and a second obtaining units in cooperation with the communication IF 28.

The ROM 14 stores the system program and various data, and data or the like in the ROM 14 is read by the CPU 12 and transmitted to the bus 30. The RAM 16 is mainly used as a work area for the CPU 12 to execute the system program and the application programs. The data or the like in the RAM 16 is read by the CPU 12 and transmitted to the bus 30, and the data or the like written from the CPU 12 is stored in the RAM 16 from the bus 30.

The operation IF 18 is configured to include input devices such as a keyboard and a mouse, and the operation IF 18 outputs a command, data, and, the like inputted by the user through the operation IF 18 to the CPU 12 through the bus 30. Especially, the operation IF 18 is used to move the cursor C on the arrangement of the history information and the arrangement of the shared history information, and to indicate processing to the icon selected by the cursor C. The operation IF 18 functions as an operation unit.

The display image generation unit 20 generates image information for displaying a processing result or the like processed by the CPU 12 and transmitted to the bus 30, and outputs the image information to the display IF 22 through the bus 30. The display image generation unit 20 generates image information of a Web page from display data of the Web page, generates image information for a history display from the history information of a user and the shared history information of other users, and transmits the image information to the bus 30.

The display IF 22 outputs the processing result or the like processed by the CPU 12 and transmitted to the bus 30 to the display 24. The display IF 22 outputs the image information generated by the display image generation unit 20 and transmitted to the bus 30 to the display 24. The display 24 is a display device such as a monitor or a display panel. The display 24 may be provided integrally with the history display apparatus 10, or may be provided separately from the display apparatus 10. The input device and the display device may be integrally provided as a touch panel. The display image generation unit 20, the display IF 22, and the display 24 function as a display unit.

The HDD 26 stores application programs and various data in a hard disk. According to a read instruction from the CPU 12, the HDD 26 reads data or the like in the hard disk and transmits the data to the bus 30, and according to a write instruction from the CPU 12, the HDD 26 writes data or the like on the bus 30 into the hard disk. The HDD 26 reads the history information of a user from the hard disk, transmits the history information of the user to the bus 30, and writes the history information of the user into the hard disk. The HDD 26 functions as a storage unit.

The communication IF 28 is configured to include a communication device for performing data communication to and from external apparatuses including the server 2 on the network 3. The communication IF 28 transmits/receives information necessary for browsing Web pages to/from the external apparatuses on the network 3. The communication IF 28 transmits/receives the history information of a user and the shared history information of other users to/from the server 2.

[3. History Display Method]

Figure 4:
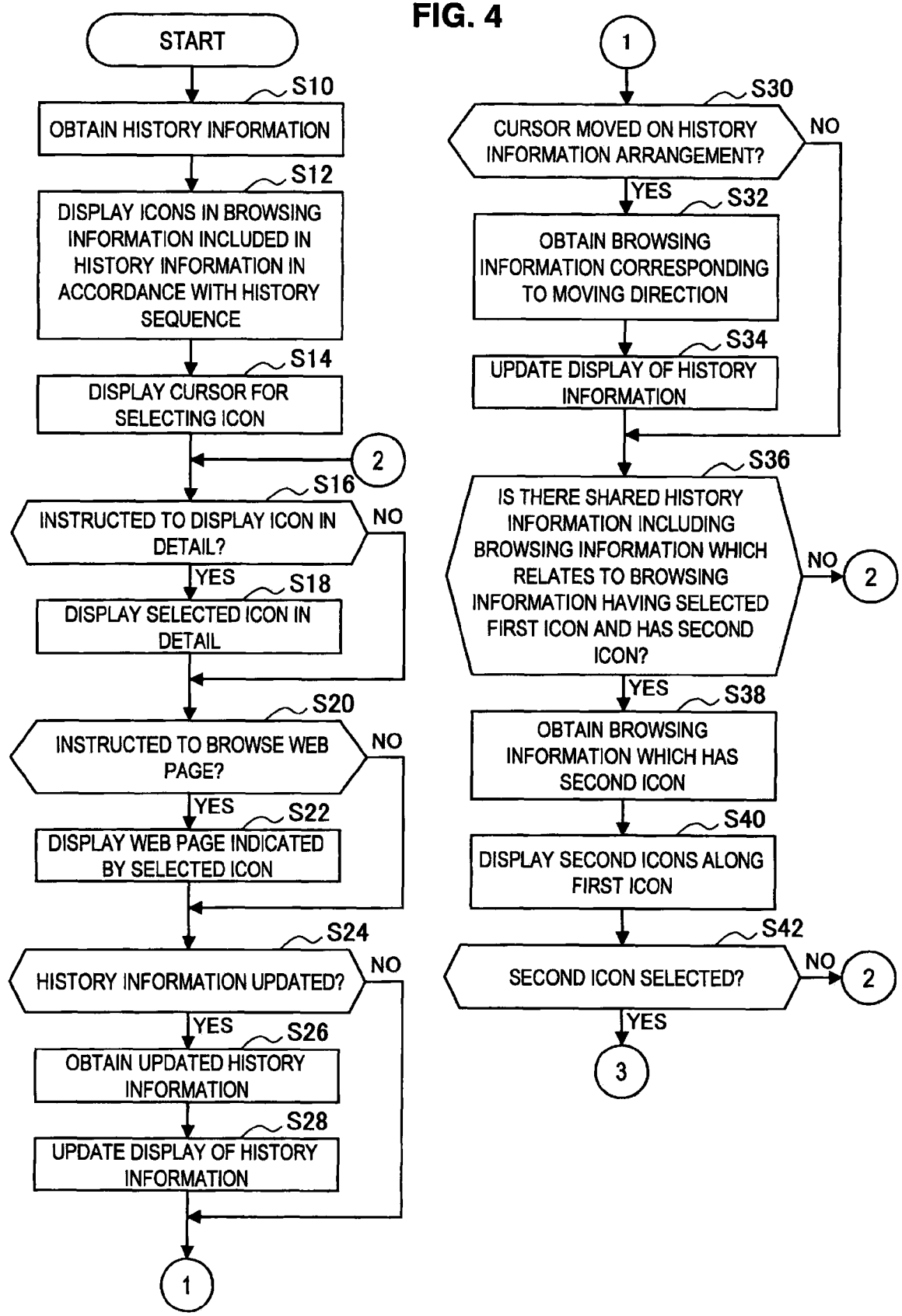
FIG. 4 is a flowchart showing a flow of a history display method according to the embodiment.
Figure 5:
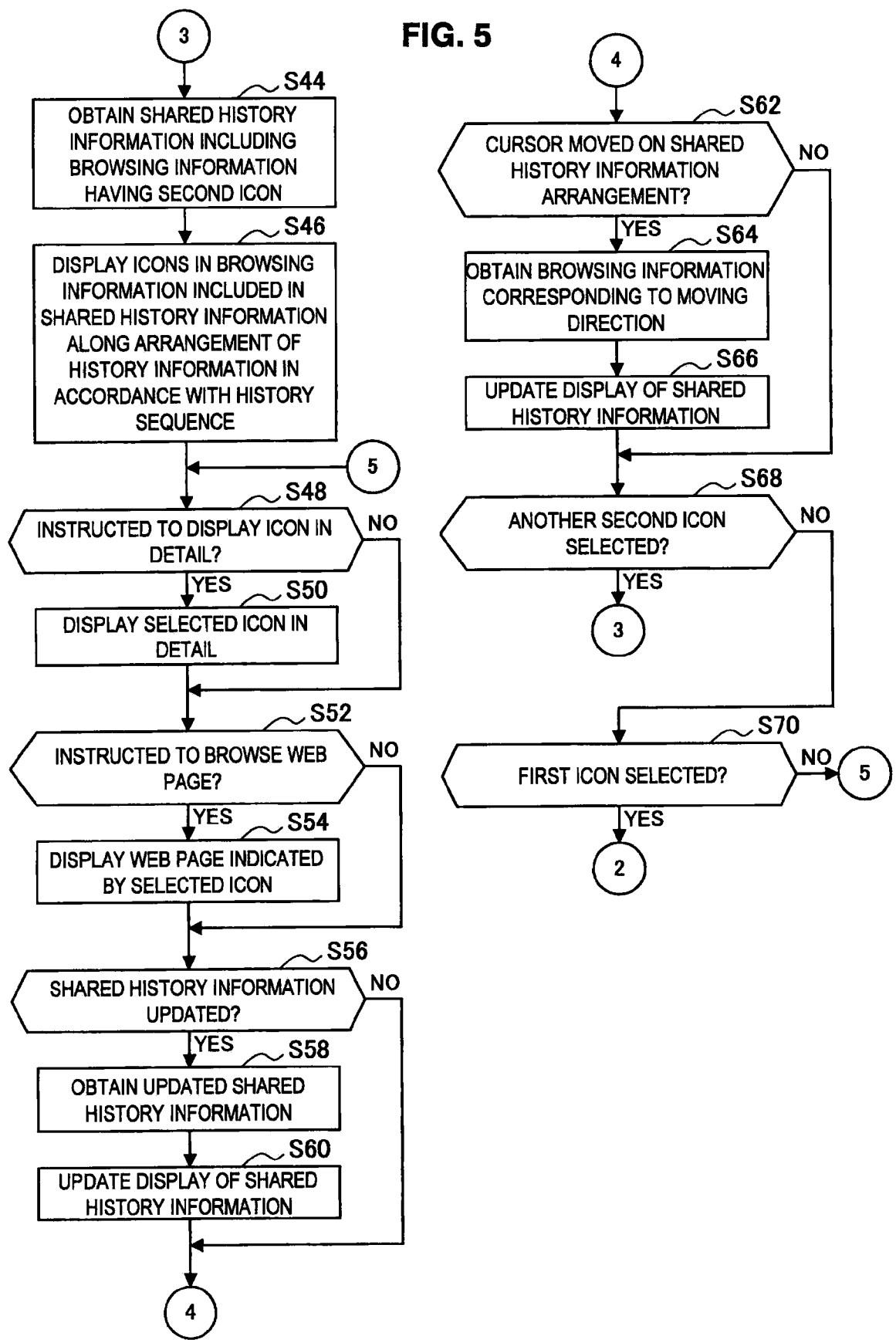
FIG. 5 is a flowchart showing a flow of the history display method according to the embodiment.

Next, a history display method according to this embodiment will be described with reference to FIGS. 4 to 13. In FIGS. 4 and 5, a process flow of the history display method is shown, and in FIGS. 6 to 13, an example of a display screen by the history display method is shown.

When a user specifies a Web page and performs a browsing operation by using the Web browsing program 8, the CPU 12 accesses an external apparatus on the network 3 via the communication IF 28 according to the specified Web page address, and transmits/receives information necessary for browsing the Web page. When the data for displaying the Web page is received, the CPU 12 causes the display image generation unit 20 to generate image information of the Web page, and outputs the image information to the display 24 via the display IF 22, so that the display 24 displays the specified Web page.

Hereinafter, a case in which icons in the browsing information items included in the history information of the user and the shared history information of other users are arranged according to time series order of browsing date and time will be described. The icons in the browsing information items may be arranged according to a before-after relation, contents, or the number of browsing times of the browsed Web pages.

When the icons are arranged according to the browsing date and time of the Web pages, the browsing information items have information indicating dates and times when the Web pages were browsed in order to specify the history sequence of the browsed Web pages. In this way, the icons in the browsing information items included in the history information and the shared history information are arranged according to time series order, so that a temporal change in the browsing history of each user can be referred.

When the icons are arranged according to the before-after relation of the Web pages, the browsing information items have information indicating the before-after relation of the browsing of the Web pages along with the information indicating dates and times when the Web pages were browsed in order to specify the history sequence of the browsed Web pages. In this way, it is possible to refer to a browsing history accompanying a divergent page transition operation in which, for example, a page transition operation from a first page to a second page is performed, and further a page transition operation in which the page returns to the first page and moves to a third page is performed.

When the icons are arranged according to the contents of the Web pages, the browsing information items have information indicating the contents of the Web pages along with the information indicating dates and times when the Web pages were browsed in order to specify the history sequence of the browsed Web pages. In this way, it is possible to refer to the browsing history focusing on the contents of the Web pages, for example it is possible to refer to the browsing history in which a browsing related to a mobile phone is performed after a browsing related to a camera is performed.

When the icons are arranged according to the number of browsing times of the Web pages, the browsing information items have information indicating the number of browsing times of each Web page in order to specify the history sequence of the browsed Web pages. In this way, for example, by arranging the browsing information items in descending order of the number of browsing times, it is possible to refer to the browsing information items according to usefulness of the browsing information items.

When a specified Web page is displayed, the CPU 12 creates the browsing information item of the Web page as the action information item showing browsing action of the user. Here, when icons in the browsing information items are arranged in time series order of the browsing dates and times, the browsing information is created as information having an icon (identification information) representing the browsed Web page, the address of the Web page, and the browsing date and time.

Here, the icon representing the Web page is created, for example, as a thumbnail image made of a reduced image of the screen shot of the Web page. The icon is not limited to the screen shot of the Web page, but may be substituted by an image, a symbol, a character, and the like by which the Web page can be identified. The address of the Web page is an address such as a URL, a URI, or the like of the selected Web page. The browsing date and time are information indicating the date and time when the Web page is browsed. The icon may be substituted by an address indicating a storage destination of the icon data.

The browsing information item may include attribute information of the Web page. The attribute information of the Web page includes classification information of the Web page, additional information such as a tag, and the like. The classification information of the Web page is assigned according to the address of the Web page (for example, domain name), an existing classification standard, and the like. The additional information of the Web page may be assigned by an administrator of the Web site, or may be assigned by a user according to folksonomy or the like. The attribute information of the Web page may be assigned in advance, may be assigned in the history display apparatus 10, and may be assigned in the server 2.

The CPU 12 updates the history information stored in the history information DB 6 by using the created browsing information item. The CPU 12 transmits an update request of the shared history information to the server 2 along with a user ID and the browsing information via the communication IF 28. When receiving the update request, the server 2 updates the shared history information of the user stored in the shared history information DB 5 according to the user ID. The history information and the shared history information may be updated only when a time period from when the Web page is displayed to when the Web page is transferred to another Web page exceeds a predetermined time period.

The creation and update of the browsing information item may be processed by the history display program 7 or the Web browsing program 8, or may be cooperatively processed between both programs. In the latter case, between both programs, a cooperative processing can be performed via plug-in software of the Web browsing program 8 and a proxy server.

When the user performs a display operation of the browsing history by using the history display program 7, the CPU 12 obtains or reads the history information of the user from the history information DB 6 (step S10). Here, for example, a predetermined number of browsing information items are obtained in a reverse chronological order of the browsing dates and times from the browsing information items included in the history information. When the browsing information items are obtained, the CPU 12 causes the display image generation unit 20 to generate image information for a history display so that the icons in the browsing information items are arranged according to the browsing dates and times in the browsing information items, and causes the display 24 to display the image information (S12). The CPU 12 causes the display 24 to display the image information for the history display so that the cursor C is displayed on the icon in the latest browsing information item (S14).

Figure 6:
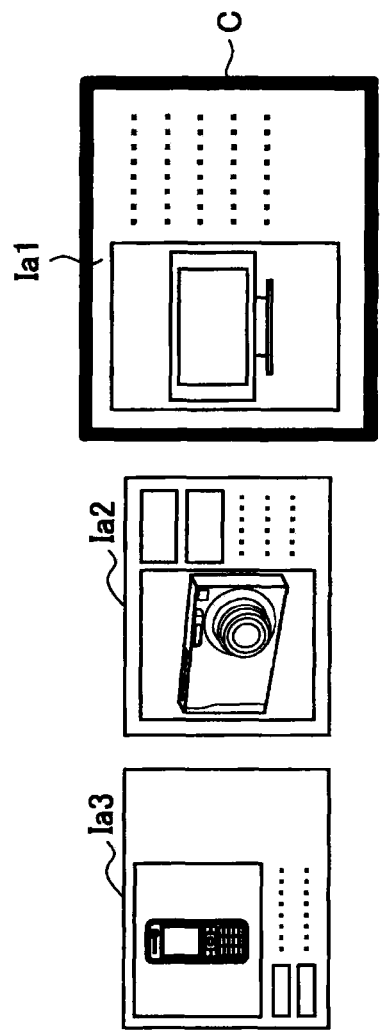
FIG. 6 is an illustration showing an example of a display screen of an initial display.

FIG. 6 shows a display screen which displays icons Ia1 to Ia3 in three browsing information items in a reverse chronological order of the browsing dates and times from the browsing information items included in the history information. Here, the icons Ia1 to Ia3 are arranged according to the browsing dates and times in the browsing information items. The icon Ia1 in the latest browsing information item is enlarged compared with the other icons Ia2 and Ia3, and displayed in the center of the display area, in a state of being selected by the cursor C.

The user can refer to his or her browsing history by using the history information displayed on the display 24. The user can refer to the detail of the icon selected by the cursor C, and browse the Web page represented by the icon. Also, the user can select an icon in a browsing information item included in the history information by moving the cursor C on the arrangement of the history information.

Figure 7:
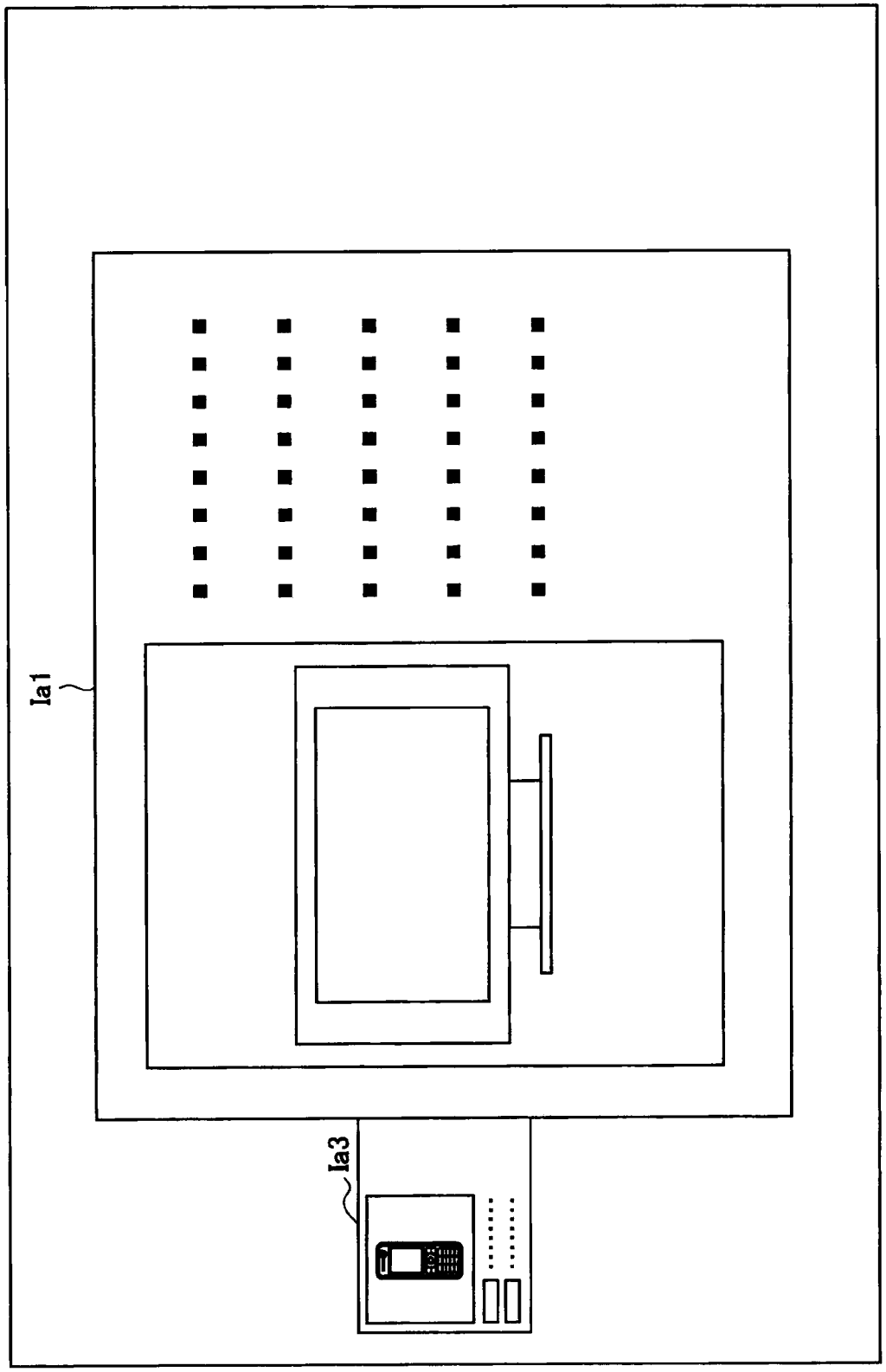
FIG. 7 is an illustration showing an example of a display screen of a detailed display.

When the user instructs that the detail of the icon selected by the cursor C should be displayed (S16), the CPU 12 displays the detail of the selected icon (S18). FIG. 7 shows a display screen which displays the detail of the icon Ia1 in the latest browsing information item.

When the user instructs that the Web page represented by the icon selected by the cursor C should be browsed (S20), the CPU 12 accesses an external apparatus on the network 3 according to the address in the browsing information item having the selected icon, and causes the display 24 to display the Web page on the display 24 (S22). Here, a browsing information item of the Web page is created, and the history information of the user may be updated by using the created browsing information item.

Figure 8:
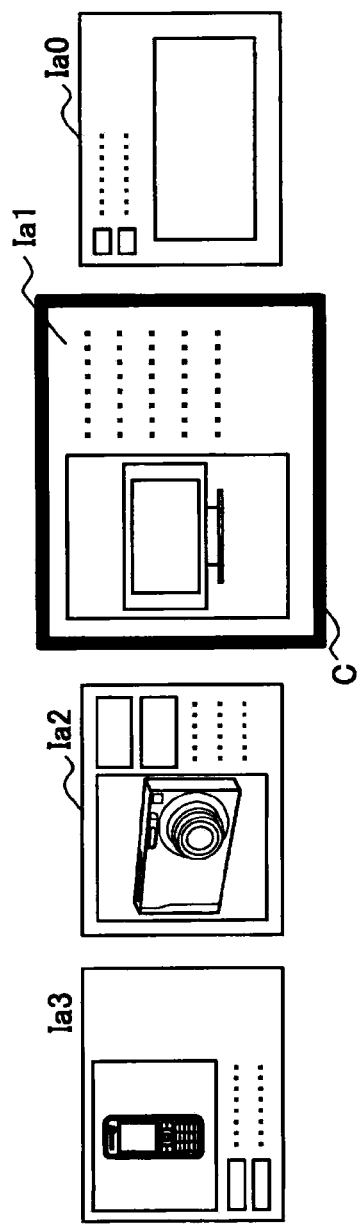
FIG. 8 is an illustration showing an example of a display screen of an update display.

When the history information is updated by the Web page browsing operation of the user (S24), the CPU 12 obtains the browsing information item of the user again from the history information DB 6, and updates the display of the history information (S26, S28). FIG. 8 shows a display screen in which the history information is updated by using the browsing information item having the browsing date and time later than those of the browsing information item having the icon Ia1, in the state of the display screen displayed in FIG. 6. In this case, when the update of the history information is detected, first, the CPU 12 obtains the browsing information item having the browsing date and time later those of the browsing information item having the icon Ia1 from the history information DB 6. Next, the CPU 12 arranges the icon Ia0 in the new browsing information item on the right side of the icon Ia1, and causes the display 24 to display the arrangement.

When the user moves the cursor C on the arrangement of the history information, according to the move operation of the cursor C in the before-after direction of the history sequence, the CPU 12 causes the display 24 to display an icon included in the browsing information item which is included in the history information and arranged in the before-after direction of the history sequence. When the user moves the cursor C in the chronological direction/the reverse chronological direction (S30) of the history sequence, the CPU 12 checks whether the new/old browsing information item is stored in the history information DB 6 based on the browsing dates and times in the browsing information item, and obtains the corresponding browsing information item from the history information DB 6, and updates the display of the history information (S32, S34). In FIGS. 6 to 13, the more in the right side of the figure, the newer the browsing information item is, and the icons in the browsing information items are displayed.

Figure 9:
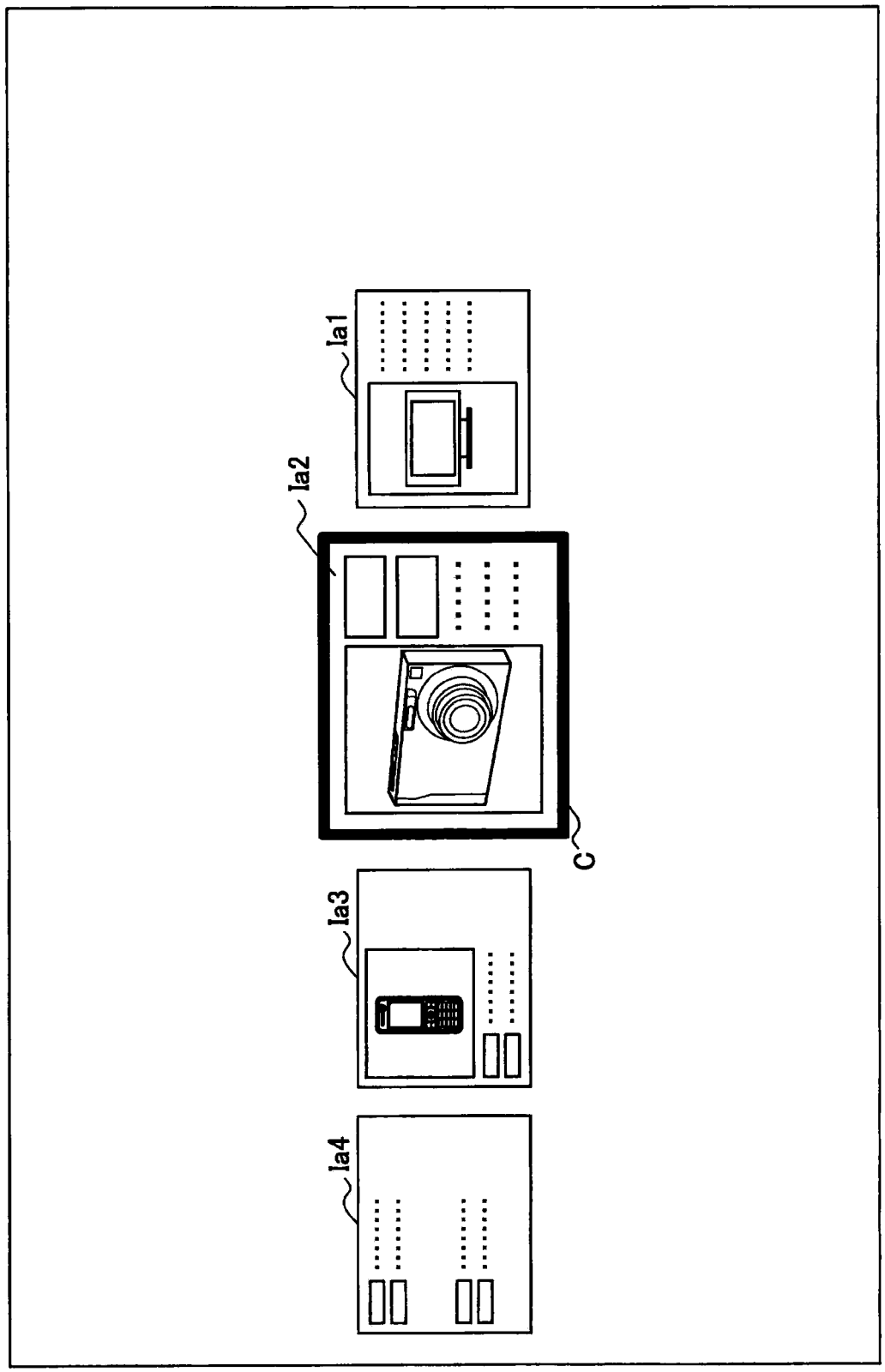
FIG. 9 is an illustration showing an example of a display screen when a cursor is moved.

FIG. 9 shows a display screen in which the user moves the cursor C to the icon Ia2, in the state of the display screen displayed in FIG. 6. In this case, the CPU 12 checks whether a browsing information item having the browsing date and time older than those of the browsing information item having the icon Ia3 is stored in the history information DB 6, and obtains the corresponding browsing information item from the history information DB 6. Thereafter, the CPU 12 arranges the icon Ia2 in the center of the display area, and arranges an icon Ia4 included in the older browsing information item on the left side of the icon Ia3, and causes the display 24 to display the icons.

When the user moves the cursor C on the arrangement of the history information, the CPU 12 determines whether the shared history information item which is one of one or more shared history information items of other users and satisfies a predetermined condition is stored in the shared history information DB 5 (S36). Here, in the shared history information items, it is determined whether there is a shared history information item including a browsing information item which relates to the browsing information item having a first icon selected by the cursor C and has a second icon.

The CPU 12 may access the server 2 to search the shared information item of other users by itself, or may specify a search condition to cause the server 2 to search the shared information item. When the CPU 12 searches by itself, the CPU 12 searches the shared history information item stored in the shared history information DB 5 by using an address (for example, domain name) and attribute information (for example, classification information and additional information) in the browsing information item having the first icon as search conditions. On the other hand, when the CPU 12 causes the server 2 to search, the CPU 12 transmits a search request along with the search conditions mentioned above via the communication IF 28, and causes the server 2 to search the shared history information item stored in the shared history information DB 5 according to the search conditions.

When there are one or more shared history information items which satisfy a predetermined condition, the CPU 12 obtains a browsing information item which is included in the shared history information items, related to the browsing information item having the first icon, and has the second icon (S38). Thereafter, the CPU 12 arranges the second icons included in the browsing information items included in the one or more shared history information items in a direction different from the arrangement direction of the history information, and causes the display 24 to display the second icons (S40). In this way, the arrangement of the history information items of the user and the arrangement of the one or more shared history information items of other users are connected to each other via the first and the second icons, and displayed.

Figure 10:
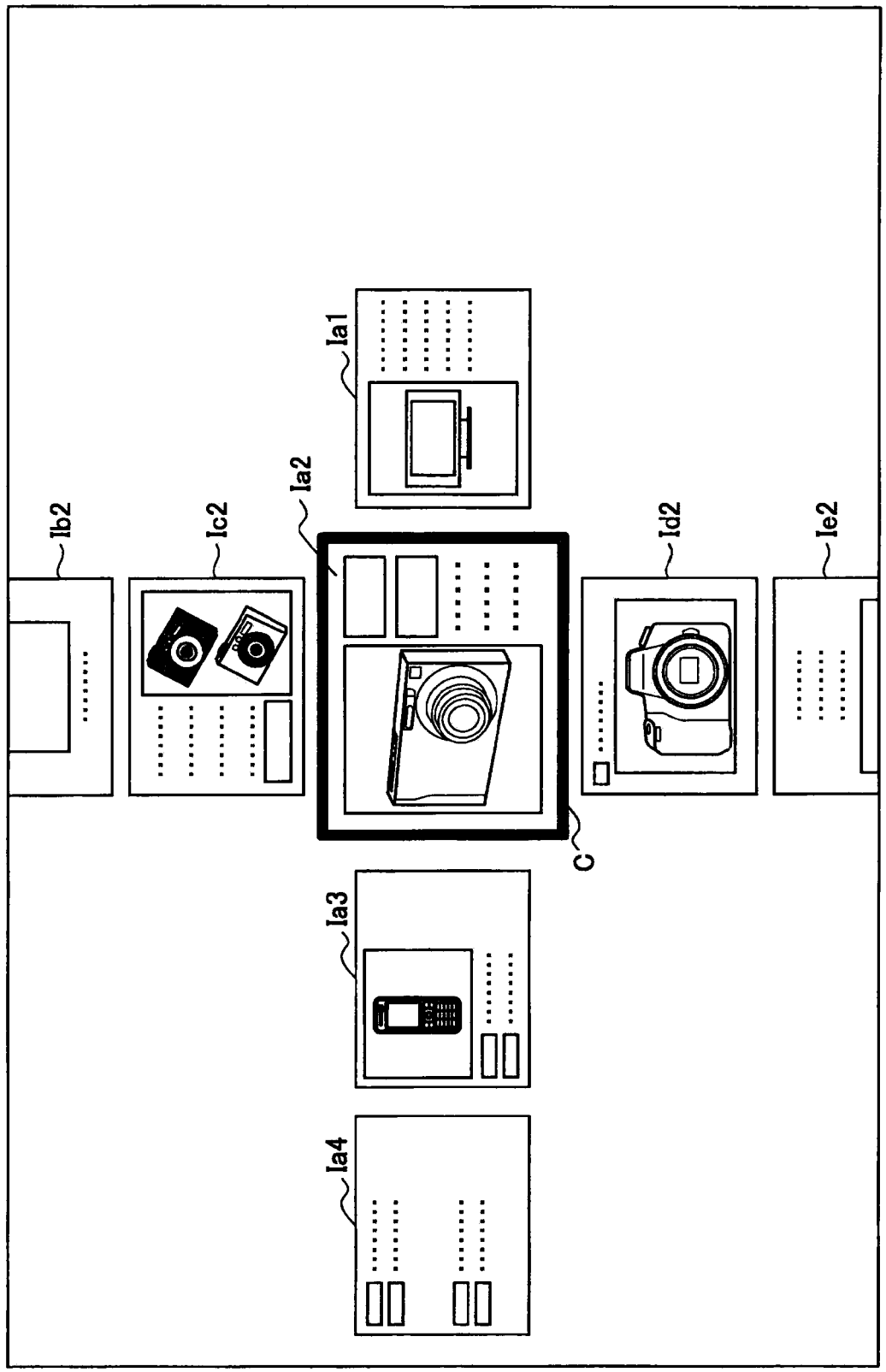
FIG. 10 is an illustration showing an example of a display screen when displaying a first and second browsing information items.

FIG. 10 shows a display screen which displays icons Ia1 to Ia4 included in the browsing information items in the history information, and the second icons Ib2, Ic2, Id2, and Ie2 included in four shared history information items of other users. The icon Ia2 is selected by the cursor C as the first icon, and between the first icon Ia2 and the second icons Ib2, Ic2, Id2, and Ie2, the browsing information items having these icons have a relationship (for example, about camera) with each other. The icons Ia1 to Ia4 are arranged according to the browsing dates and times in the browsing information items with the first icon Ia2 being centered, and the second icons Ib2, Ic2, Id2, and Ie2 are arranged in a line over and under the first icon Ia2.

When the CPU 12 displays the second icons included in the browsing information items in two or more shared history information items, the CPU 12 may change the arrangement of the two or more second icons according to the degree of relationship between the browsing information items having the first icon and causes the display 24 to display the icons. For example, the arrangement of the two or more second icons is changed so that the higher the degree of relationship between the browsing information items having the first icon and address (for example, domain name) and attribute information (for example, classification information and additional information) the second icon in the browsing information item has, the closer to the first icon the second icon is displayed.

Figure 11:
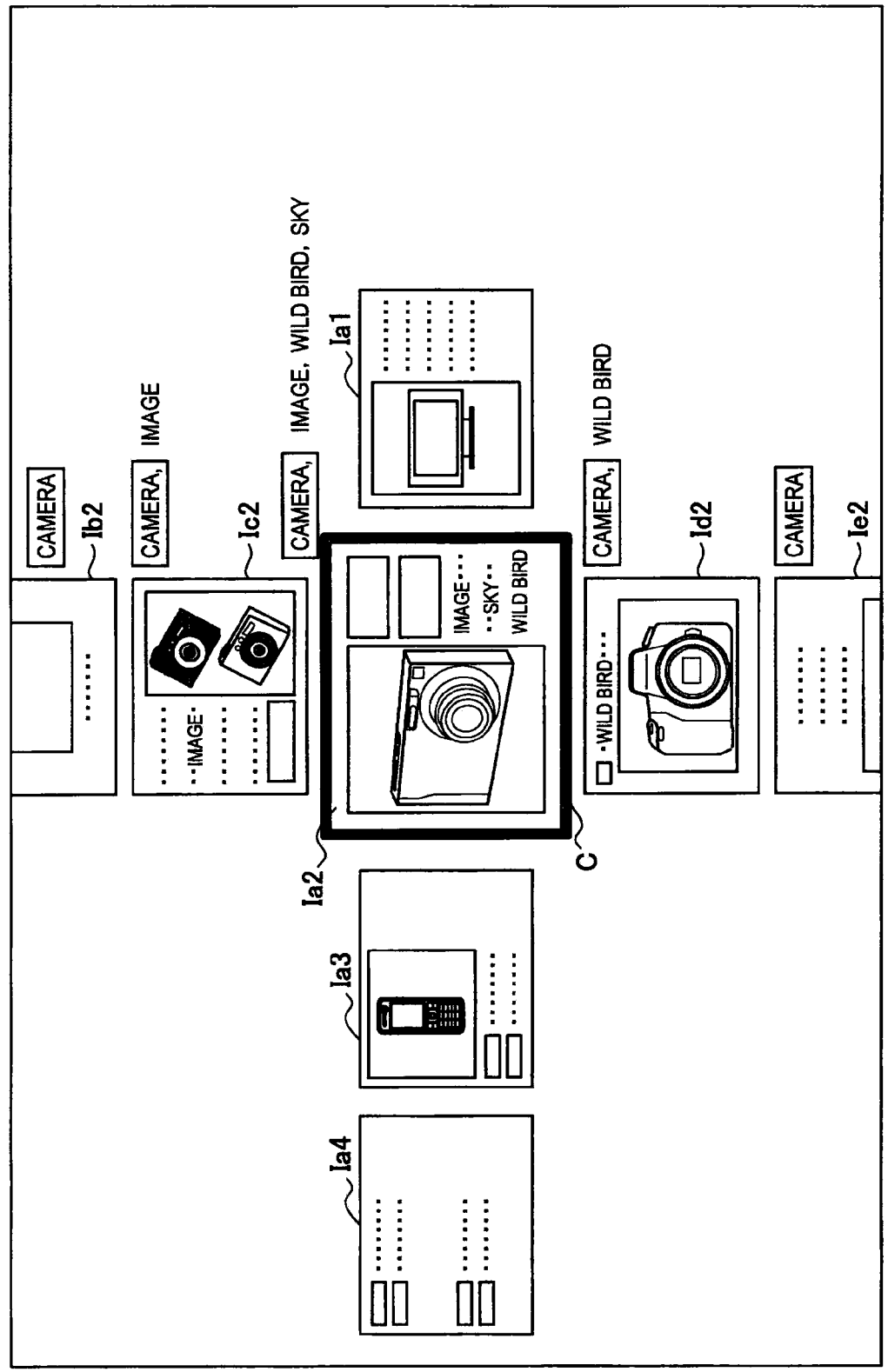
FIG. 11 is an illustration showing a modification of a display screen when displaying the first and the second browsing information items.

FIG. 11 shows a display screen which displays icons Ia1 to Ia4 included in the browsing information items in the history information, and second icons Ib2, Ic2, Id2, and Ie2 included in the browsing information items in four shared history information items. The icon Ia2 is selected by the cursor C as the first icon, and between the first icon Ia2 and the second icons Ib2, Ic2, Id2, and Ie2, the browsing information items having these icons have a relationship with each other.

Here, the browsing information item having the first icon Ia2 includes tags of "camera", "image" "wild bird", and "sky". Here, the browsing information item corresponding to the second icon Ic2 includes tags of "camera" and "image", and the browsing information item corresponding to the second icon Id2 includes tags of "camera" and "wild bird". The browsing information items corresponding to the second icons Ib2 and Ie2 include a tag of "camera".

Therefore, between the first icon Ia2 and the second icons Ic2 and Id2, two tags ("camera" and "image", or "camera" and "wild bird") of the browsing information item of the first icon correspond respectively to two tags of the browsing information item of the second icons, and between the first icon Ia2 and the second icons Ib2 and Ie2, one tag ("camera") of the browsing information item of the first icon corresponds to one tag of the browsing information item of the second icons. Between the first icon Ia2 and the second icons Ic2 and Id2, the degree of relationship of tags between the browsing information items is determined to "2", and between the first icon Ia2 and the second icons Ib2 and Ie2, the degree of relationship of tags between the browsing information items is determined to "1".

Therefore, the second icons Ic2 and Id2 in the browsing information items having relatively high degree of relationship are arranged over and under the first icon Ia2. The second icons Ib2 and Ie2 in the browsing information items having relatively low degree of relationship are respectively arranged over the first icon Ia2 via the second icon Ic2 and under the first icon Ia2 via the second icon Id2.

Figure 12:
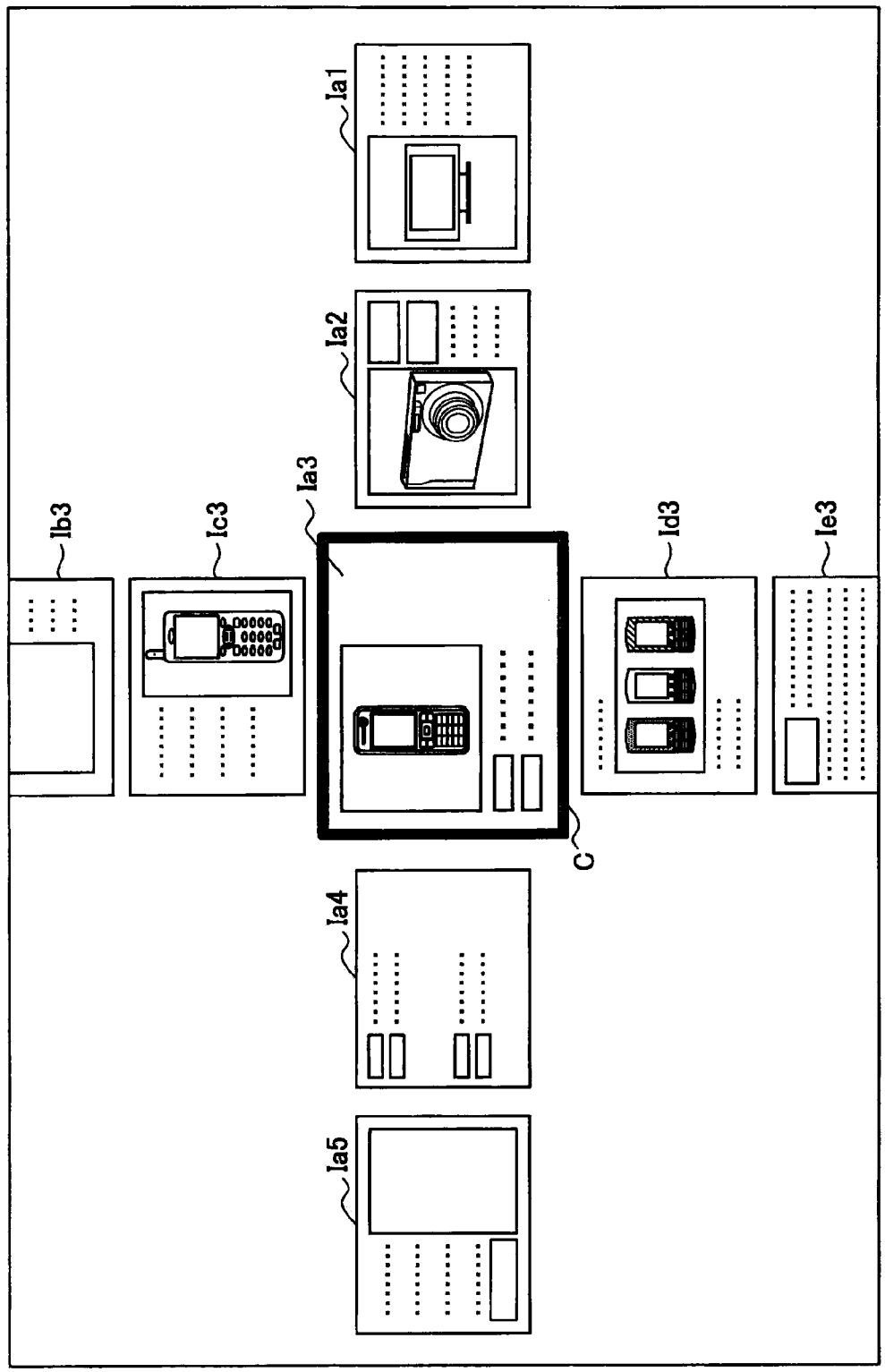
FIG. 12 is an illustration showing an example of a display screen when displaying the first and the second browsing information items.

FIG. 12 shows a display screen which displays icons Ia1 to Ia5 included in the browsing information items in the history information, and second icons Ib3, Ic3, Id3, and Ie3 included in the browsing information items in four shared history information items. The display screen shown in FIG. 12 shows a state in which the cursor C is moved to the left from the position shown in FIG. 10, and the icon Ia3 is selected as the first icon. Between the first icon Ia3 displayed in the center of the display area and the second icons Ib3, Ic3, Id3, and Ie3, the browsing information items having these icons have a relationship (for example, about mobile phone) with each other. The second icons Ib3, Ic3, Id3, and Ie3 are arranged in a line over and under the first icon Ia3.

In a state in which one or more second icons are displayed, by moving the cursor C from the first icon to each of the second icons, a user can select the second icons included in the browsing information items in one or more shared history information items of other users.

When the user moves the cursor C to the second icon (S42), the CPU 12 obtains the shared history information item including the browsing information item having the second icon selected by the cursor C form the server 2 (S44). Here, from the shared history information, a predetermined number of browsing information items preceding or following the browsing information item having the selected second icon in the history sequence are selected. For example, the browsing information items whose browsing dates and times are preceding or following the browsing information item having the second icon are obtained. Thereafter, the CPU 12 arranges the icons included in the browsing information items included in the shared history information in a predetermined history sequence, and causes the display 24 to display the icons (S46).

Figure 13:
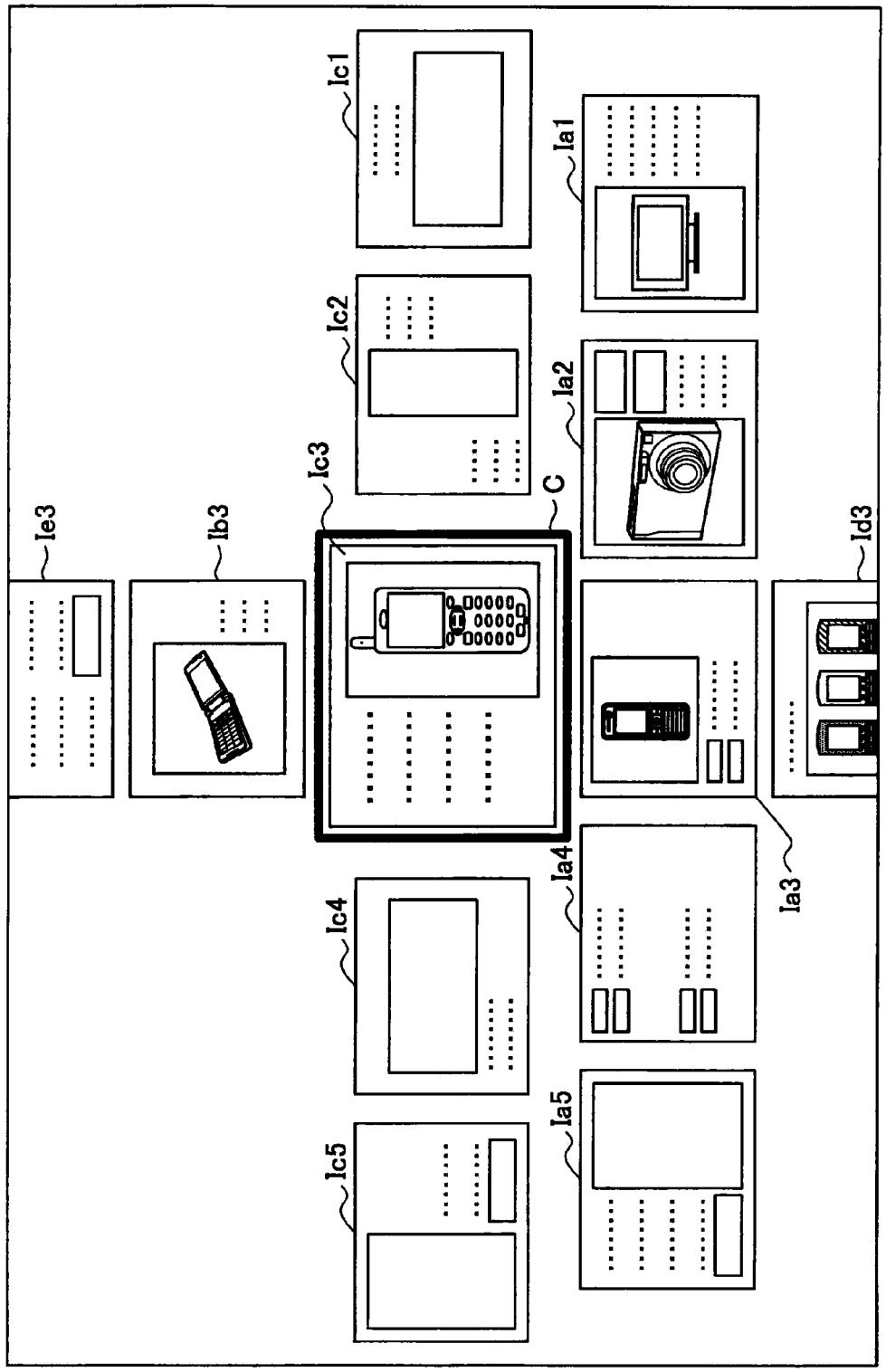
FIG. 13 is an illustration showing an example of a display screen when the cursor is moved on the second browsing information items.

FIG. 13 shows a display screen which displays icons Ic1, Ic2, Ic4, and Ic5 included in the browsing information items preceding or following the browsing information item having the second icon Ic3, along with the icons Ia1 to Ia5, Ib3, Ic3, Id3, and Ie3 shown in FIG. 12. The display screen shown in FIG. 13 shows a state in which the cursor C is moved upward from the position shown in FIG. 12, and the second icon Ic3 is selected.

The user can refer to other users' browsing history by using the shared history information displayed on the display 24. When the user instructs that the detail of the icon selected by the cursor C should be displayed (S48), the CPU 12 displays the detail of the selected icon (S50).

When the user instructs that the Web page represented by the icon selected by the cursor C should be browsed (S52), the CPU 12 accesses an external apparatus on the network 3 according to the address in the browsing information item having the selected icon, and causes the display 24 to display the Web page (S54). Here, a browsing information item of the Web page is created, and the history information of the user may be updated by using the created browsing information item.

When the shared history information is updated by the Web page browsing operation of other user (S56), the CPU 12 obtains the browsing information item of the other user again from the shared history information DB 5, and updates the display of the shared history information (S58, S60). When the user moves the cursor C on the arrangement of the shared history information items (S62), the CPU 12 causes the display 24 to display an icon included in the browsing information item which is included in the shared history information and arranged in the before-after direction of the history sequence, according to the move operation of the cursor C in the before-after direction of the history sequence (S64, S66).

In a state in which one or more second icons are displayed, the user can move the cursor C between the second icons, or from a second icon to the first icon. When the user moves the cursor C between the second icons (S68), the CPU 12 performs processing of step S44 and after on the shared history information including the browsing information item having the second icon selected by the cursor C. When the user moves the cursor C from a second icon to the first icon (S70), the CPU 12 performs processing of step S16 and after on the history information.

In this way, by moving the cursor C between the arrangement of the history information and the arrangement of the shared history information via the first and the second icons, and referring to the browsing information items included in the history information and the shared history information, the user can efficiently refer to his or her own browsing history and other users' browsing histories.

[4. Modification of History Display]

Next, a modification of the history display will be described with reference to FIGS. 14 and 15. In the above description, a case in which icons in the browsing information items included in the history information of the user and the shared history information of other users are arranged in a line respectively according to a predetermined history sequence is described. However, the icons in the browsing information items may be displayed using a tree structure or a three-dimensional structure, instead of being displayed in lines.

In FIG. 14, a modification in which the icons in the browsing information items are displayed using a tree structure is shown. FIG. 14 shows icons If1 to If6 representing Web pages F1 to F6 which a user F has browsed, and icons Ig1 to Ig5 representing Web pages G1 to G5 which a user G has browsed.

According to FIG. 14, the user F browsed pages F1, F2, thereafter browsed pages F3, F4 in order, thereafter returned to page F2, and thereafter browsed pages F5, F6 in order. In other words, a divergent page transition from page F2 to pages F3 and F5 is performed. The user G browsed pages G1 and G2, thereafter browsed pages G3 and G4 in order, thereafter returned to page G2, and thereafter browsed pages G5. In other words, a divergent page transition from page G2 to pages G3 and G5 is performed.

Between the Web page F2 which the user F has browsed and the Web page G2 which the user G has browsed, the browsing information items of these Web pages have a relationship (for example, about camera) with each other. Therefore, the user F can refer to the browsing history of the user G, by moving the cursor C from the first icon If2 to the second icon Ig2 to trace the browsing information items included in the shared history information of the user G.

When the icons in the browsing information items are displayed using a tree structure, if the number of divergent page transitions increases, visibility of the icons in the browsing information items decreases. In this case, the display of the icons in the browsing information items is desired to be adjusted, for example, by displaying only a group of icons included in a part of browsing information items diverged from a divergent point.

Figure 15:
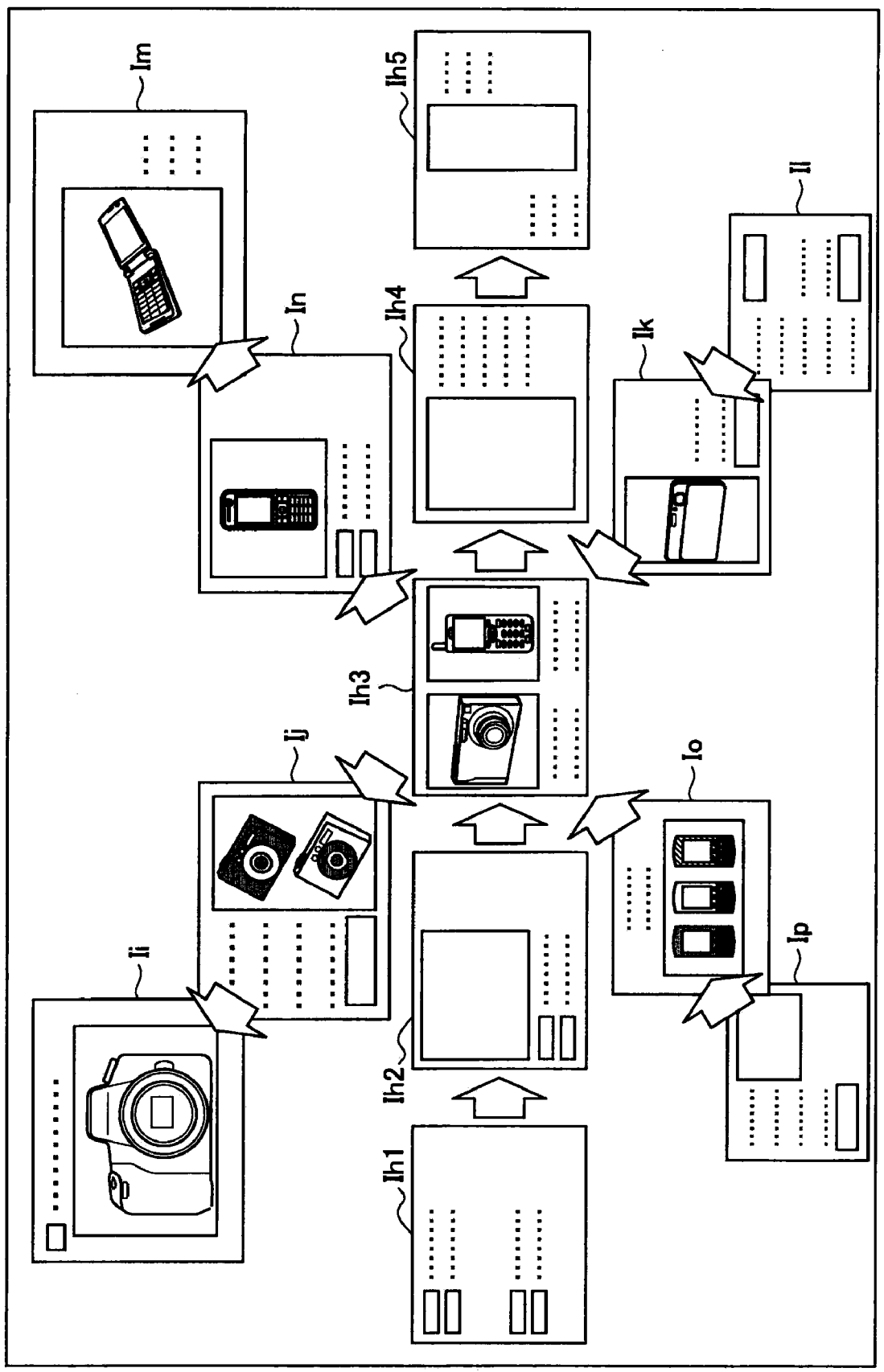
FIG. 15 is an illustration showing an example of a display screen when displaying the browsing information items three-dimensionally.

In FIG. 15, a modification in which the icons in the browsing information items are displayed three-dimensionally is shown. In FIG. 15, icons Ih1 to Ih5 representing Web pages H1 to H5 which a user H has browsed are displayed. Also, second icons Ii to Il representing Web pages I to L whose browsing information items have a relationship with that of Web page H3, and second icons Im to Ip representing Web pages M to P are displayed. Here, for example, a tag in the browsing information item of the Web page H3 includes "camera" and "mobile phone", tags in the browsing information items of the Web pages I to L include "camera", and tags in the browsing information items of the Web pages M to P include "mobile phone".

Therefore, the second icons Ii to Il which represent Web pages I to L and each of which includes the same tags "camera" and "mobile phone" as those of Web page H3, and the second icons Im to Ip which represent the Web pages M to P are displayed on different lines. Since, between the Web page H3 and Web pages I to L, the relationship is higher in order of the Web page I to the Web page L, the displays of the second icons Ii to Il are adjusted so that the higher the relationship is, the larger the display size is. This is the same between the Web page H3 and Web pages M to P.

Since display restriction is alleviated by displaying the browsing information items three-dimensionally as described above, the browsing histories of multiple users can be referred in a state in which the browsing information items are correlated with each other by using attributes (for example, camera and mobile phone) different from each other.

[5. Conclusion]

As described above, according to the history display apparatus 10 of this embodiment, first, according to the move operation of the cursor C on the arrangement of the history information arranged and displayed in a predetermined history sequence, the shared history information including the browsing information item which relates to the browsing information item having the first icon selected by the cursor C and has the second icon is obtained from the server 2. Next, the icons in two or more browsing information items included in the shared history information are arranged and displayed in parallel with the arrangement of the history information in a predetermined history sequence so that the second icon is displayed adjacent to the first icon. Thereafter, via the first and second icons, the cursor C is moved between the arrangement of the history information and the arrangement of the shared history information, and according to the move operation of the cursor C in the before-after direction of the history sequence on the arrangement to which the cursor C is moved, an icon in the browsing information item in the before-after direction of the history sequence is displayed.

In this way, by moving the cursor C between the arrangement of the history information and the arrangement of the shared history information which are connected via the first and the second icons, and referring to the browsing information items included in the history information and the shared history information, the user can efficiently refer to his or her own action history and other users' action histories.

It should be understood by those skilled in the art that various modifications, combinations, sub-combinations and alterations may occur depending on design requirements and other factors insofar as they are within the scope of the appended claims or the equivalents thereof.

For example, in the description of the above embodiment, a case in which the history display apparatus 10 used by users stores users' history information into the history display apparatus 10 (the history information DB 6), and at the same time stores the users' history information into the server 2 (the shared history information DB 5) as the shared history information, and obtains and displays the history information of the users is described. In this case, the users' browsing history can be referred by using the history display apparatus 10 even when the history display apparatus 10 is not connected to the server 2.

However, the history display apparatus 10 of each user may cause the server 2 to store the users' history information into the server 2 (the shared history information DB 5) as the shared history information, and obtain the users' shared history information stored in the server 2 (shared history information DB 5) and display the users' shared history information as the users' history information. In this case, the users' browsing history can be referred, even if a data storage unit (history information DB 6) for storing the users' history information is not provided in the history display apparatus 10.

In the description of the above embodiment, a case in which the browsing histories of the Web pages are displayed is described. However, the present invention can also be applied to a case in which other action histories of users such as contents viewing history of users are displayed.

The present application contains subject matter related to that disclosed in Japanese Priority Patent Application JP 2008-299923 filed in the Japan Patent Office on 25 Nov. 2008, the entire content of which is hereby incorporated by reference.

What is claimed is:

1. A history display controlling apparatus, comprising:
   a processor;
   a first obtaining unit coupled to the processor and configured to obtain history information representing one or more action histories of a first user by action information items having identification information items representing action objects of the first user;
   a second obtaining unit coupled to the processor and configured to obtain, from an external apparatus shared, history information representing one or more action histories of a second user by action information items having identification information items representing the action objects of the second user;
   a display control unit coupled to the processor and configured to control a display unit to arrange and display the identification information items held by the one or more action information items included in the history information in a predetermined history sequence, and control the display unit to arrange and display the identification information items held by the one or more action information items included in the shared history information in the predetermined history sequence; and an operation unit coupled to the processor and configured to cause the first user to move a selection frame on an arrangement of the history information and an arrangement of the shared history information, wherein:

the second obtaining unit obtains from the external apparatus the shared history information including an action information item which relates to the action information item having the first identification information item selected by the selection frame and has a second identification information item according to a move operation of the selection frame on the arrangement of the history information;

the display control unit controls the display unit to display the second identification information item next to the first identification information item in a different direction from the arrangement direction of the history information, and to arrange and display two or more identification information items included in the shared history information in parallel with the arrangement of the history information in the predetermined history sequence;

the operation unit moves the selection frame between the arrangement of the history information and the arrangement of the shared history information via the first and the second identification information items; and the display control unit controls the display unit to display an identification information item held by an action information item which is included in the history information and is arranged in a before-after direction of the history sequence, according to a move operation of the selection frame in the before-after direction of the history sequence on the arrangement of the history information, and displays an identification information item held by an action information item which is included in the shared history information and is arranged in the before-after direction of the history sequence, according to a move operation of the selection frame in the before-after direction of the history sequence on the arrangement of the shared history information.

2. The history display controlling apparatus according to claim 1, wherein the second obtaining unit obtains the shared history information including the action information item having the second identification information item based on a relationship between the action information items having the first and the second identification information items.

3. The history display controlling apparatus according to claim 1, wherein the second obtaining unit obtains the shared history information including the action information item having the second identification information item based on a relationship between attribute information items of the action information items having the first and the second identification information items.

4. The history display controlling apparatus according to claim 1, wherein the second obtaining unit obtains two or more of the shared history information items of the second user stored in the external apparatus, and the display control unit controls the display unit to arrange and display the second identification information items held by the action information items included in the two or more shared history information items, according to a relationship between the action information item having the first identification information item and the action information items having the second identification information items included in the two or more shared history information items.

5. The history display controlling apparatus according to claim 1, further comprising:

a storage unit which stores the history information of the first user, wherein the first obtaining unit obtains the history information of the first user from the storage unit.

6. The history display controlling apparatus according to claim 1, wherein the history information of the first user is stored in the external apparatus, and the first obtaining unit obtains the history information of the first user from the external apparatus.

7. The history display controlling apparatus according to claim 1, wherein the history information of the first user is updated by using action information created according to actions of the first user.

8. The history display controlling apparatus according to claim 1, wherein the shared history information of the second user is updated by using action information created according to actions of the second user.

9. The history display controlling apparatus according to claim 1, wherein the display control unit controls the display unit to arrange and display the identification information items held by the two or more action information items included in the history information using a tree structure in a predetermined history sequence, and controls the display unit to arrange and display the identification information items held by the two or more action information items included in the shared history information using a tree structure in the predetermined history sequence.

10. The history display controlling apparatus according to claim 4, wherein the display control unit controls the display unit to arrange and display three-dimensionally the second identification information items held by the action information items included in the two or more shared history information items, according to a relationship between the action information item having the first identification information item and the action information items having the second identification information items included in the two or more shared history information items.

11. A history display controlling system, comprising:

an external apparatus; and a history display controlling apparatus in communication with the external apparatus, the history display controlling apparatus comprising:

a processor;

a first obtaining unit coupled to the processor and configured to obtain history information representing one or more action histories of a first user by action information items having identification information items representing action objects of the first user, a second obtaining unit coupled to the processor and configured to obtain, from an external apparatus, shared history information representing one or more action histories of a second user by action information items having identification information items representing the action objects of the second user;

a display control unit coupled to the processor and configured to control a display unit to arrange and display the identification information items held by the one or more action information items included in the history information in a predetermined history sequence, and to control the display unit to arrange and display the identification information items held by the one or more action information items included in the shared history information in the predetermined history sequence; and an operation unit coupled to the processor and configured to cause the first user to move a selection frame on an arrangement of the history information and an arrangement of the shared history information, wherein:

the second obtaining unit obtains from the external apparatus the shared history information including an action information item which relates to the action information item having the first identification information item selected by the selection frame and has a second identification information item according to a move operation of the selection frame on the arrangement of the history information;

the display control unit controls the display unit to display the second identification information item next to the first identification information item in a different direction from the arrangement direction of the history information, and to arrange and display two or more identification information items included in the shared history information in parallel with the arrangement of the history information in the predetermined history sequence;

the operation unit moves the selection frame between the arrangement of the history information and the arrangement of the shared history information via the first and the second identification information items; and the display control unit controls the display unit to display an identification information item held by an action information item which is included in the history information and is arranged in a before-after direction of the history sequence, according to a move operation of the selection frame in the before-after direction of the history sequence on the arrangement of the history information, and to display an identification information item held by an action information item which is included in the shared history information and is arranged in the before-after direction of the history sequence, according to a move operation of the selection frame in the before-after direction of the history sequence on the arrangement of the shared history information.

12. A computer-implemented method, comprising:

obtaining history information representing one or more action histories of a first user by action information items having identification information items representing action objects of the first user;

controlling a display unit to arrange and display the identification information items held by one or more action information items included in the history information in a predetermined history sequence;

obtaining, from an external apparatus, shared history information representing one or more action histories of a second user by action information items having identification information items representing action objects of the second user according to a move operation of a selection frame on the arrangement of the history information, the shared history information including an action information item which relates to the action information item having the first identification information item selected by the selection frame and has a second identification information item;

controlling, using at least one processor, the display unit to display the second identification information item next to the first identification information item in a different direction from the arrangement direction of the history information, and to arrange and display identification information items held by two or more action information items included in the shared history information in parallel with the arrangement of the history information in a predetermined history sequence;

moving the selection frame between the arrangement of the history information and the arrangement of the shared history information via the first and the second identification information items according to an operation of the first user;

controlling the display unit to display an identification information item held by an action information item which is included in the history information and is arranged in a before-after direction of the history sequence, according to a move operation of the selection frame in the before-after direction of the history sequence on the arrangement of the history information; and controlling the display unit to display an identification information item held by an action information item which is included in the shared history information and is arranged in the before-after direction of the history sequence, according to a move operation of the selection frame in the before-after direction of the history sequence on the arrangement of the shared history information.

13. A tangible, non-transitory computer-readable medium storing instruction that, when executed by at least one processor, cause the at least one processor to perform a method, comprising:

obtaining history information representing one or more action histories of a first user by action information items having identification information items representing action objects of the first user;

controlling a display unit to arrange and display the identification information items held by one or more action information items included in the history information in a predetermined history sequence;

obtaining, from an external apparatus, shared history information representing one or more action histories of a second user by action information items having identification information items representing action objects of the second user according to a move operation of a selection frame on the arrangement of the history information, the shared history information including an action information item which relates to the action information item having the first identification information item selected by the selection frame and has a second identification information item;

controlling the display unit to display the second identification information item next to the first identification information item in a different direction from the arrangement direction of the history information, and to arrange and display identification information items held by two or more action information items included in the shared history information in parallel with the arrangement of the history information in a predetermined history sequence;

moving the selection frame between the arrangement of the history information and the arrangement of the shared history information via the first and the second identification information items according to an operation of the first user;

controlling the display unit to display an identification information item held by an action information item which is included in the history information and is arranged in a before-after direction of the history sequence, according to a move operation of the selection frame in the before-after direction of the history sequence on the arrangement of the history information; and controlling the display unit to display an identification information item held by an action information item which is included in the shared history information and is arranged in the before-after direction of the history sequence, according to a move operation of the selection frame in the before-after direction of the history sequence on the arrangement of the shared history information.

14. The history display controlling system of claim 11, wherein the external apparatus is connected to the history display control apparatus via a communication line and is configured by a processor to store at least the shared history information of the other user.

15. The method of claim 12, wherein obtaining the shared history information comprises obtaining the shared history information based on at least one of a relationship between the action information items or a relationship between attribute information items of the action information items.

16. The method of claim 12, wherein:
obtaining the shared history information comprises obtaining a plurality of the shared history information items of the second user stored in the external apparatus; and
the method further comprises controlling the display unit to arrange and display the second identification information items according to a relationship between the action information item having the first identification information item and the action information items having the second identification information items included in the two or more shared history information items.

17. The method of claim 12, further comprising updating the history information of the first user based on one or more actions of the first user.

18. The method of claim 12, further comprising updating the shared history information of the second user based on one or more actions of the second user.

19. The method of claim 12, further comprising:
controlling the display unit to arrange and display the identification information items held by the two or more action information items included in the history information using a tree structure; and
controlling the display unit to arrange and display the identification information items held by the two or more action information items included in the shared history information using a tree structure.

20. The method of claim 12, further comprising generating a three-dimensional display of the second identification information items held by the action information items included in the two or more shared history information items, according to a relationship between the action information items having the first identification information item and the action information items having the second identification information items included in the two or more shared history information items.

\* \* \* \* \*